(12) United States Patent
Mejdrich et al.

(10) Patent No.: US 8,719,455 B2
(45) Date of Patent: May 6, 2014

(54) DMA-BASED ACCELERATION OF COMMAND PUSH BUFFER BETWEEN HOST AND TARGET DEVICES

(75) Inventors: Eric O. Mejdrich, Woodinville, WA (US); Paul E. Schardt, Rochester, MN (US); Robert A. Shearer, Rochester, MN (US); Matthew R. Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 612 days.

(21) Appl. No.: 12/824,674

(22) Filed: Jun. 28, 2010

(65) Prior Publication Data

US 2011/0320724 A1    Dec. 29, 2011

(51) Int. Cl.
*G06F 3/00* (2006.01)
*G06F 13/28* (2006.01)

(52) U.S. Cl.
USPC ................................................ 710/5; 710/22

(58) Field of Classification Search
None
See application file for complete search history.

(56) References Cited

U.S. PATENT DOCUMENTS

| | | | | |
|---|---|---|---|---|
| 5,652,887 A | * | 7/1997 | Dewey et al. | 719/325 |
| 6,341,302 B1 | * | 1/2002 | Celis | 718/100 |
| 7,594,057 B1 | * | 9/2009 | Gandhi et al. | 710/308 |
| 2002/0062352 A1 | * | 5/2002 | Asano et al. | 709/212 |
| 2010/0066747 A1 | * | 3/2010 | Diard | 345/502 |
| 2011/0125943 A1 | * | 5/2011 | Oikawa et al. | 710/106 |

* cited by examiner

*Primary Examiner* — Idriss N Alrobaye
*Assistant Examiner* — Richard B Franklin
(74) *Attorney, Agent, or Firm* — Wood, Herron & Evans, LLP

(57) ABSTRACT

Direct Memory Access (DMA) is used in connection with passing commands between a host device and a target device coupled via a push buffer. Commands passed to a push buffer by a host device may be accumulated by the host device prior to forwarding the commands to the push buffer, such that DMA may be used to collectively pass a block of commands to the push buffer. In addition, a host device may utilize DMA to pass command parameters for commands to a command buffer that is accessible by the target device but is separate from the push buffer, with the commands that are passed to the push buffer including pointers to the associated command parameters in the command buffer.

23 Claims, 9 Drawing Sheets

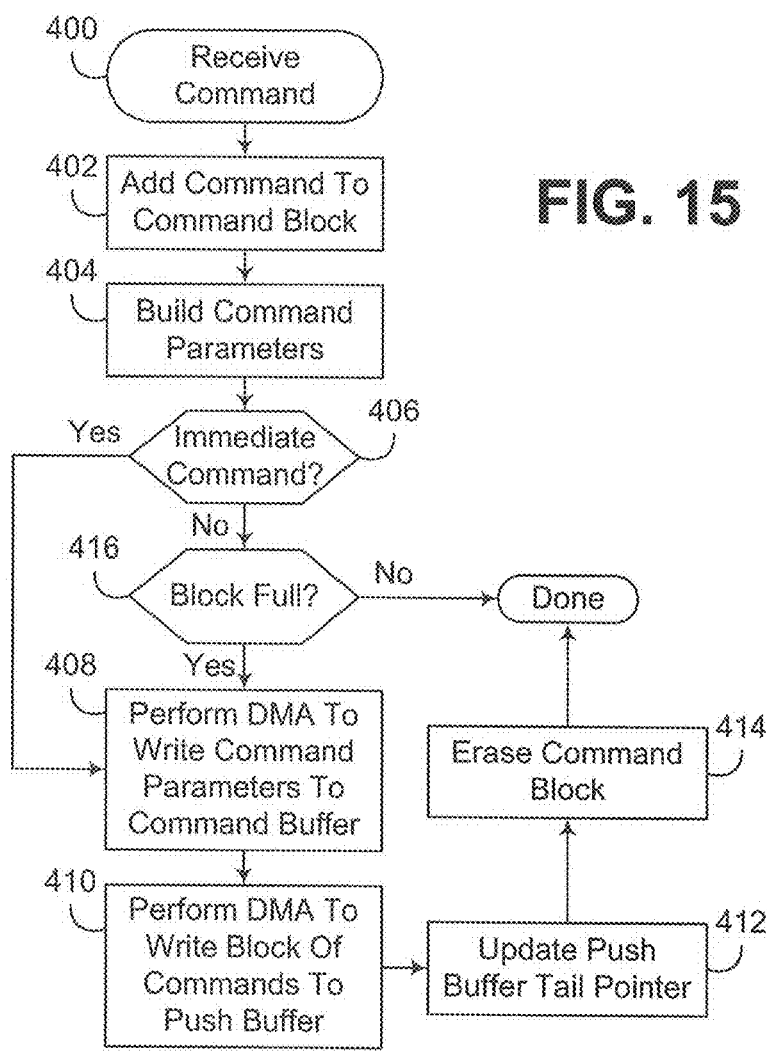

DMA-BASED ACCELERATION OF COMMAND PUSH BUFFER BETWEEN HOST AND TARGET DEVICES

FIELD OF THE INVENTION

The invention is generally related to data processing, and in particular to command-driven interaction between devices in a multithreaded processing environment.

BACKGROUND OF THE INVENTION

As semiconductor technology continues to inch closer to practical limitations in terms of increases in clock speed, architects are increasingly focusing on parallelism in processor architectures to obtain performance improvements. At the chip level, multiple processor cores are often disposed on the same chip, functioning in much the same manner as separate processor chips, or to some extent, as completely separate computers. In addition, even within cores, parallelism is employed through the use of multiple execution units that are specialized to handle certain types of operations. Pipelining is also employed in many instances so that certain operations that may take multiple clock cycles to perform are broken up into stages, enabling other operations to be started prior to completion of earlier operations. Multithreading is also employed to enable multiple instruction streams to be processed in parallel, enabling more overall work to performed in any given clock cycle.

Support the increased parallelism of processor architectures also places unique demands on the software that executes within such architectures, as the communication costs associated with passing data between different hardware threads in a multithreaded architecture can become a bottleneck on overall system performance.

One technique that has been used to facilitate the communication of data between different devices or components implemented within a multithreaded architecture relies on a shared data structure known as a push buffer. For example, a push buffer may be used to convey commands from one device or component (hereinafter referred to as a "host device") to another device or component (hereinafter referred to as a "target device"). A push buffer has the benefit of requiring a relatively modest amount of shared memory space, along with relatively little synchronization required between the host and target devices.

A push buffer may be implemented, for example, as a circular queue, with head and tail pointers used to point to entries in the queue. The head pointer typically points to the first entry in the queue awaiting processing by the target device, and the tail pointer typically points to the last entry in the queue awaiting processing by the target device, or alternatively the next unused entry. A host device thus places a command on the push buffer in the unused entry nearest the last pending entry using the tail pointer, and then updates the tail pointer to reflect the addition of the new command by updating the tail pointer. The target device, on the other hand, retrieves commands from the push buffer based upon the head pointer, and updates the head pointer as commands are pulled from the push buffer. Whenever a head or tail pointer reaches the end of the memory space allocated to the push buffer, the pointer rolls over to the start of the memory space, hence the circular nature of the push buffer.

While push buffers provide a relatively low overhead mechanism for passing commands between independent operating host and target devices, it has been found that push buffers have drawbacks in many applications. First, if a host device does not place commands on a push buffer as quickly as a target device pulls those commands from the push buffer, the target device may become starved for work and execute below its maximum capabilities. Second, in some applications, a host device may need to communicate a variable amount of data to a target device in connection with a given command. Push buffers typically operate most efficiently when entries are fixed in size, so selecting an entry size that is too small for a particular command may require command data to be passed via several commands and entries, lowering performance, while selecting an entry size that is too large to accommodate some commands is wasteful of valuable memory space for other commands having lower memory requirements.

Therefore, a need exists in the art for improved manner of communicating commands from a host device to a target device via a push buffer.

SUMMARY OF THE INVENTION

The invention addresses these and other problems associated with the prior art by utilizing Direct Memory Access (DMA) in connection with passing commands between a host device and a target device coupled via a push buffer. In one implementation, commands passed to a push buffer by a host device may be accumulated by the host device prior to forwarding the commands to the push buffer, such that DMA may be used to collectively pass a block of commands to the push buffer. In another implementation, which may be separate from or combined with collectively passing blocks of commands, a host device utilizes DMA to pass command parameters for commands to a command buffer that is accessible by the target device but is separate from the push buffer, with the commands that are passed to the push buffer including pointers to the associated command parameters in the command buffer. Through the use of one or both of these techniques, the throughput of commands between the host device and the target device may be increased, thereby minimizing any bottlenecks caused by the push buffer.

Therefore, consistent with one aspect of the invention, a circuit arrangement includes a push buffer configured to store pending commands to be processed by a target device, a host interface processor disposed in the target device and configured to retrieve pending commands from the push buffer and initiate processing of the commands by the target device, and control logic configured to accumulate a plurality of commands from the host device and perform a collective operation to store the accumulated plurality of commands in the push buffer.

Consistent with another aspect of the invention, a circuit arrangement includes a push buffer configured to store pending commands to be processed by a target device, a host interface processor disposed in the target device and configured to retrieve pending commands from the push buffer and initiate processing of the commands by the target device, a command buffer configured to store parameter data associated with a first command, Direct Memory Access (DMA) logic configured to write the parameter data for the first command in the command buffer, and control logic configured to store the first command in the push buffer by storing in the push buffer along with the first command a pointer to the parameter data in the command buffer.

These and other advantages and features, which characterize the invention, are set forth in the claims annexed hereto and forming a further part hereof. However, for a better understanding of the invention, and of the advantages and objectives attained through its use, reference should be made to the

BRIEF DESCRIPTION OF THE DRAWINGS

FIG. 15 is a flowchart illustrating the program flow of an alternate command processing routine to that of FIG. 14.

DETAILED DESCRIPTION

Embodiments consistent with the invention minimize the performance bottleneck of a push buffer by utilizing Direct Memory Access (DMA) in connection with passing commands between a host device and a target device coupled via the push buffer. In some embodiments, commands passed to a push buffer by a host device are accumulated by the host device in a command block prior to forwarding the commands to the push buffer, such that DMA may be used to collectively pass the commands to the push buffer in a collective store operation. In other embodiments, a host device may utilize DMA to pass command parameters for commands to a command buffer that is accessible by the target device but is separate from the push buffer, with the commands passed to the push buffer including pointers to the associated command parameters in the command buffer. Furthermore, by combining these techniques, or by using these techniques individually, the throughput of commands between the host device and the target device may be increased.

Other variations and modifications will be apparent to one of ordinary skill in the art. Therefore, the invention is not limited to the specific implementations discussed herein.

Hardware and Software Environment

Figure 1:
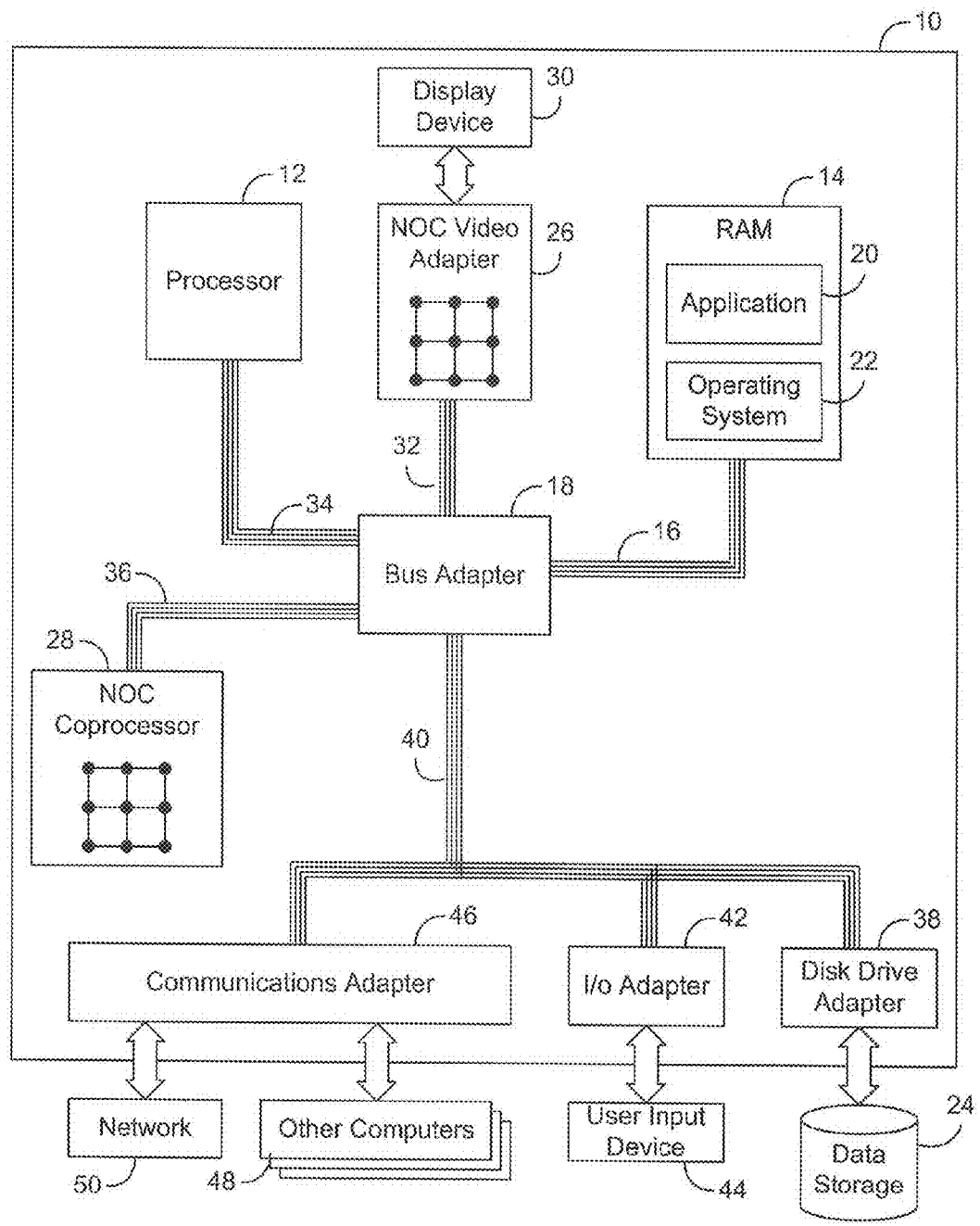
FIG. 1 is a block diagram of exemplary automated computing machinery including an exemplary computer useful in data processing consistent with embodiments of the present invention.

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
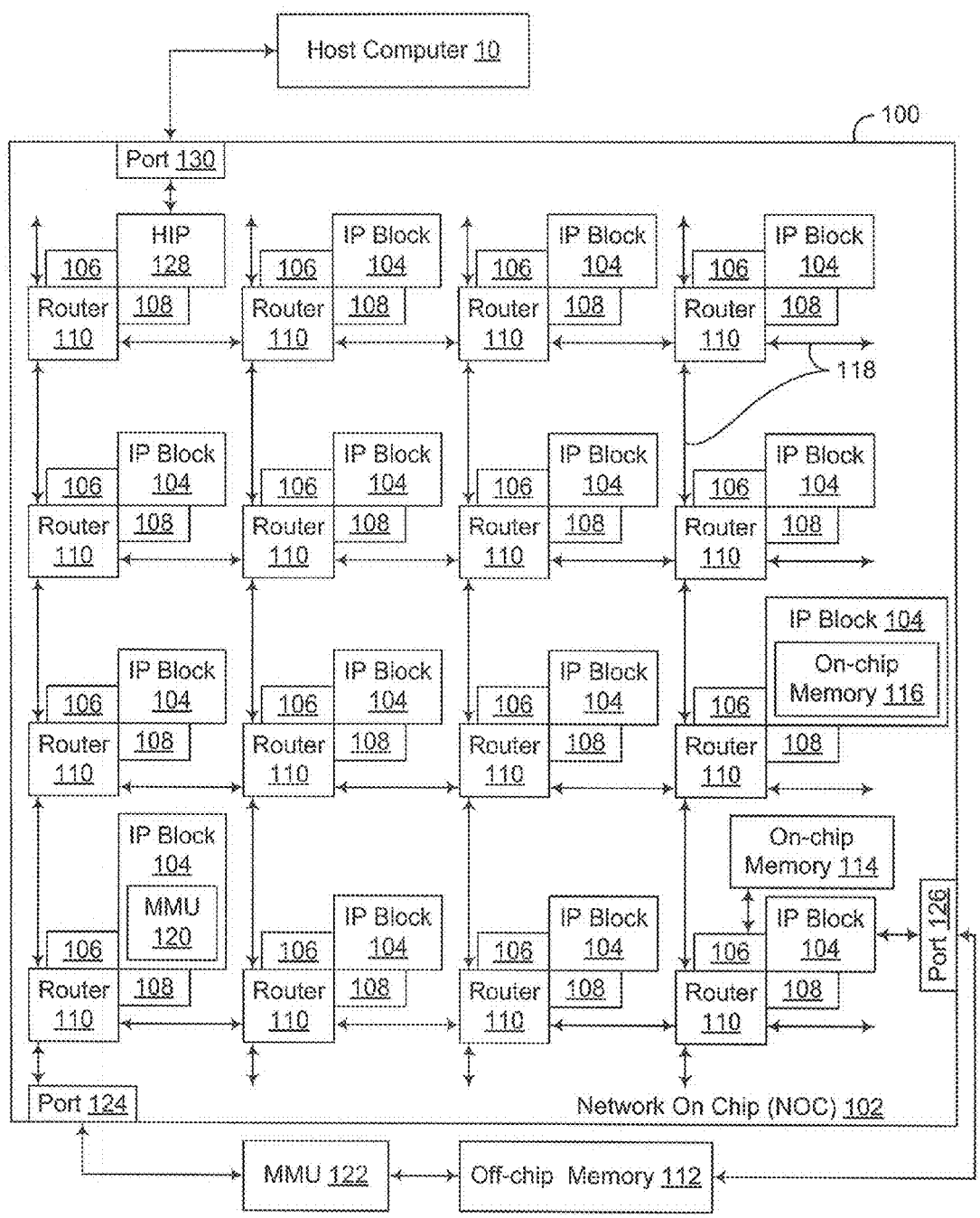
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices and data processing systems utilizing such devices, those of ordinary skill in the art having the benefit of the instant disclosure will appreciate that circuit arrangements consistent with the invention are capable of being distributed as program products in a variety of forms, and that the invention applies equally regardless of the particular type of computer readable or signal bearing media being used to actually carry out the distribution. Examples of computer readable or signal bearing media include, but are not limited to, physical, recordable type media such as volatile and non-volatile memory devices, floppy disks, hard disk drives, CD-ROMs, and DVDs (among others), and transmission type media such as digital and analog communication links.

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
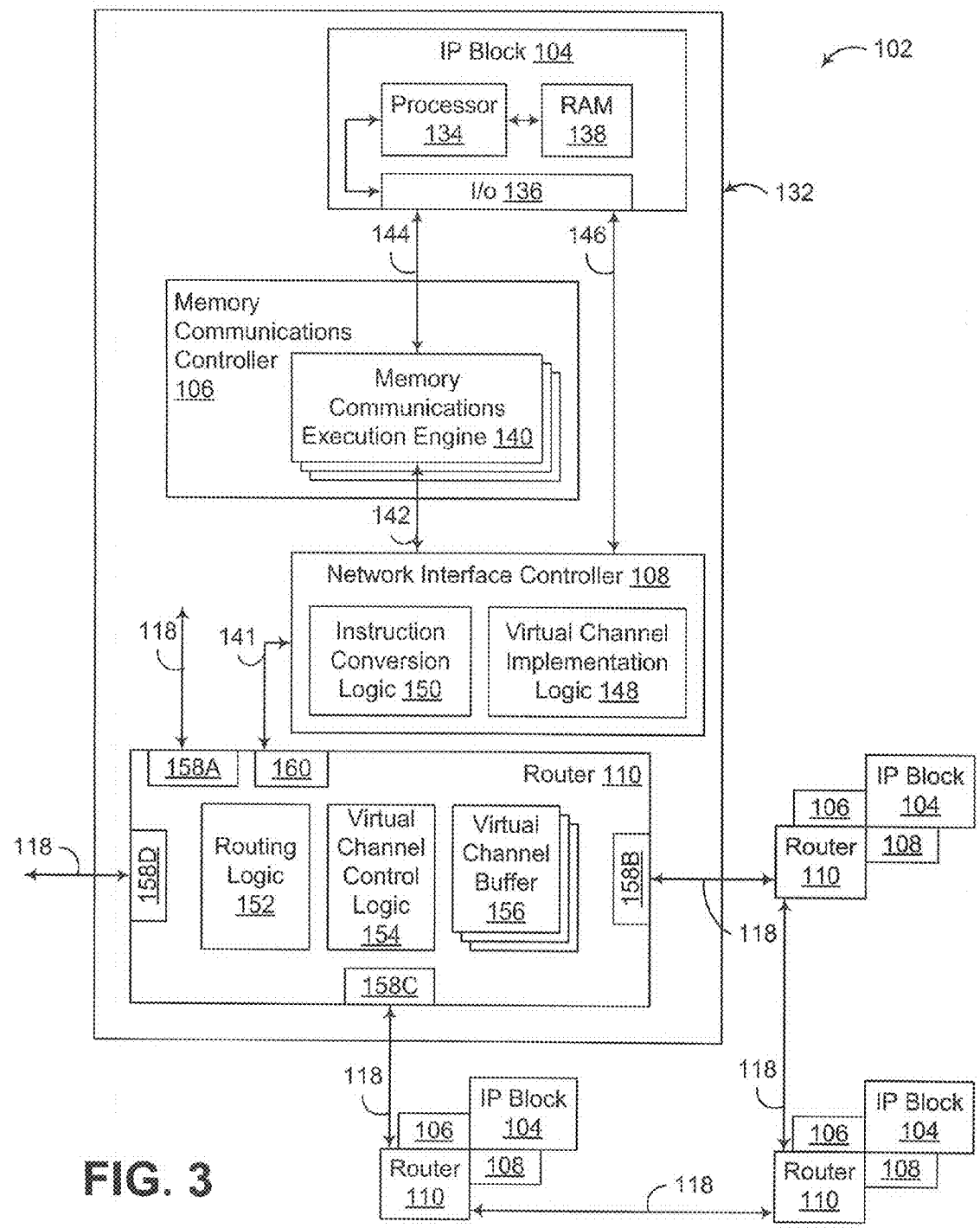
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
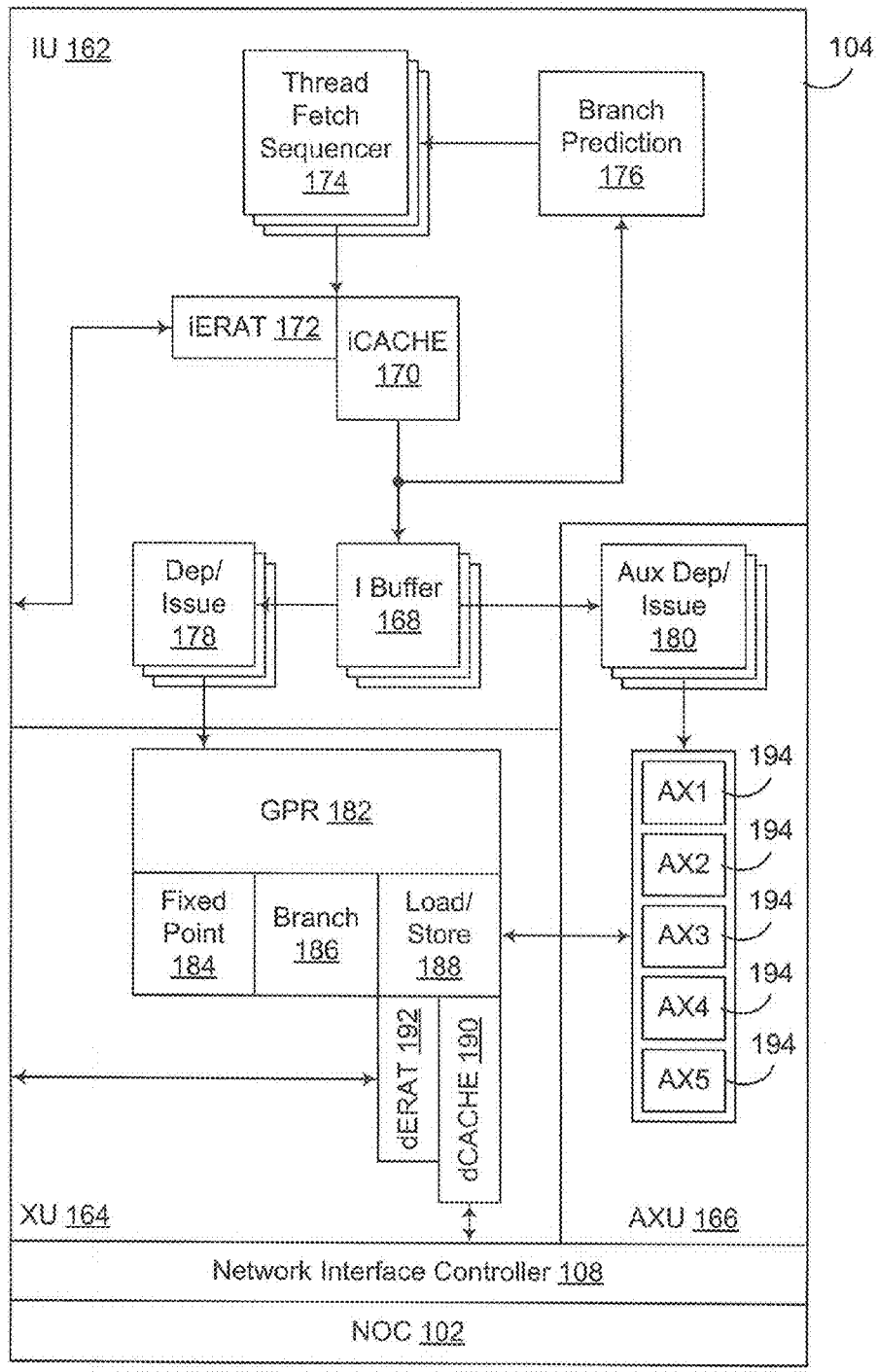
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32 b or 64 b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Software Pipelining

Figure 5:
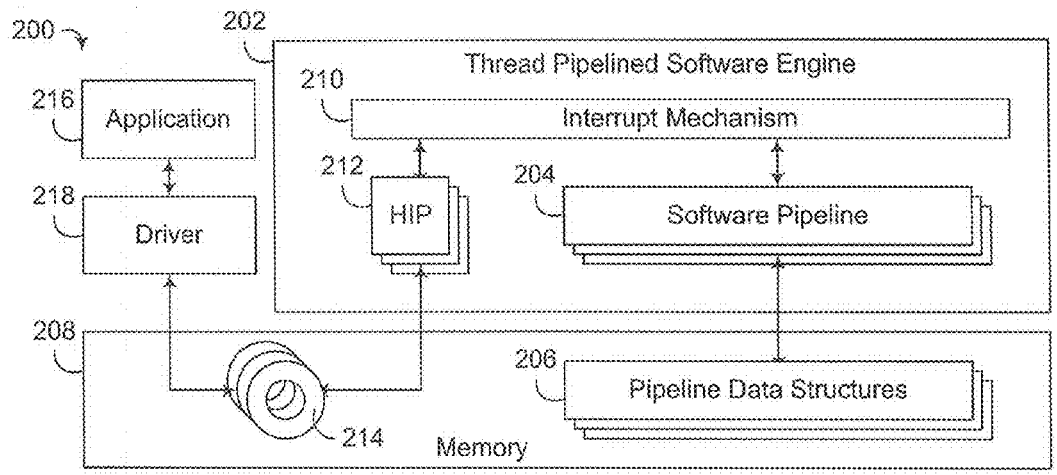
FIG. 5 is a block diagram of a thread pipelined software engine suitable for implementation in the NOC of FIG. 2.

Turning now to FIG. 5, NOC 102 may be used in some embodiments to implement a software-based pipeline. In particular, FIG. 5 illustrates an exemplary processing unit 200 incorporating a thread pipelined software engine 202 that may be used to implement and execute one or more software pipelines 204 on top of an NOC architecture. Each pipeline 204 is typically allocated one or more data structures 206 in a shared memory 208 to enable different stages of a pipeline to exchange data. Furthermore, an interrupt mechanism 210 is provided to enable stages of a pipeline to notify one another of pending work to be performed.

One or more host interface processors (HIP's) 212 are also provided in engine 202 to handle the issue of work to software pipelines 204. One or more push buffers 214 are provided to interface each HIP 212 with a software application 216 and driver 218, which are resident outside of the engine. In order to initiate work in a pipeline, a software application 216 issues requests through an appropriate driver 218 in the form of API calls, which then generates appropriate requests for the HIP and stores the requests in a push buffer 214. The HIP 212 for the relevant pipeline pulls work requests off of push buffer 214 and initiates processing of the request by the associated pipeline.

In the illustrated embodiment, and as implemented on a NOC 102, a software pipeline 204 implements a function that is segmented into a set of modules or 'stages' of computer program instructions that cooperate with one another to carry out a series of data processing tasks in sequence. Each stage in a pipeline is composed of a flexibly configurable module of computer program instructions identified by a stage ID with each stage executing on a thread of execution on an IP block 104 of a NOC 102. The stages are flexibly configurable in that each stage may support multiple instances of the stage, so that a pipeline may be scaled by instantiating additional instances of a stage as needed depending on workload. Because each stage is implemented by computer program instructions executing on an IP block 104 of a NOC 102, each stage is capable of accessing addressed memory through a memory communications controller 106. At least one stage, moreover, is capable of sending network-address based communications among other stages, where the network-address based communications maintain packet order.

The network-address based communications, for example, may be implemented using "inboxes" in each stage that receive data and/or commands from preceding stages in the pipeline. The network-address based communications maintain packet order, and are communications of a same type which are able to flow through the same virtual channel as described above. Each packet in such communications is routed by a router 110 in the manner described above, entering and leaving a virtual channel buffer in sequence, in FIFO order, thereby maintaining strict packet order and preserving message integrity.

Each stage implements a producer/consumer relationship with a next stage. The first stage receives work instructions and work piece data through a HIP 212, carries out its designated data processing tasks on the work piece, produces output data, and sends the produced output data to the next stage in the pipeline, which consumes the produced output data from the first stage by carrying out its designated data processing tasks on the produced output data from the first stage, thereby producing output data that is subsequently sent on to a next stage in the pipeline. This sequence of operations continues to the last stage of the pipeline, which then stores its produced output data in an output data structure for eventual return through the HIP 212 to the originating application 216.

Figure 6:
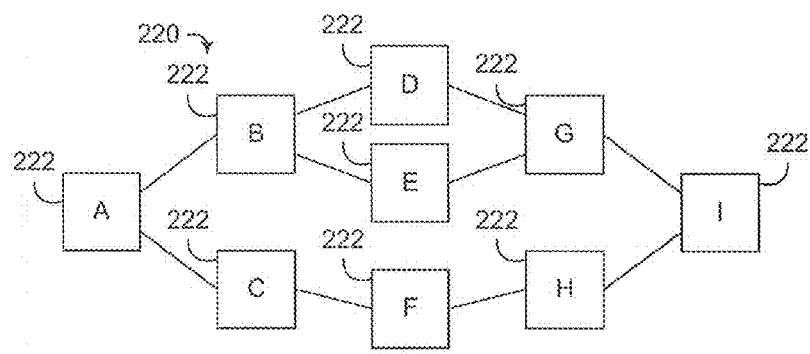
FIG. 6 is a block diagram of an exemplary software pipeline suitable for implementation in the thread pipelined software engine of FIG. 5.

The arrangement of stages in a pipeline may vary in different embodiments, as well as for performing different functions in different applications. FIG. 6, for example, illustrates an exemplary software pipeline 220 including a plurality of stage instances 222, also separately designated as instances A-I, each of which representing a thread of execution implemented on an IP block in NOC 102. The stage instances 222 are arranged in pipeline 220 into five stages, a first stage with instance A, a second stage with instances B and C, a third stage with instances D, E and F, a fourth stage with instances G and H, and a fifth stage with instance I. As can be seen from FIG. 6, instances may have a one-to-one, a one-to-many and/or a many-to-one relationship with other instances in the pipeline. Instances may operate collectively with one another in a particular stage to perform parallel tasks and share the workload, thus improving the overall throughput of the stage in performing the task. Instances in a stage may also perform different tasks from one another to enable the parallel performance of different tasks. Instances can supply data to more than one instance, while other instances may collect data and process data from multiple instances.

In the illustrated embodiment, each instance of each stage of a pipeline is typically implemented as an application-level module of computer program instructions executed on a separate IP block on a NOC, and each stage is assigned to a thread of execution on an IP block of a NOC. Each stage is assigned a stage ID, and each instance of a stage is assigned an identifier. HIP 212 (FIG. 5) typically sets up the pipeline by configuring each stage with a desired number of instances, with the network location of each instance of each stage provided to other instances of other stages to enable each instance to send its resultant workload to the proper instance in the next stage. earlier and/or later stage 3 to which an instance of stage 2 is authorized to send its resultant workload. Multiple instances may be assigned to a particular stage to provide additional processing resources relative to other stages, e.g., so work flows through the pipeline as efficiently as possible, and no single stage presents a bottleneck to performance. It will also be appreciated that workload monitoring may be performed during runtime, and that instances may be dynamically added or removed from a stage as needed for balancing the load among the stages of the pipeline.

Each stage is configured with a stage ID for each instance of a next stage, which may also include the number of instances in the next stage as well as the network location of each instance of that. Configuring a stage with IDs for instances of a next stage provides the stage with the information needed to carry out load balancing across stages. Such load balancing can be carried out, for example, by monitoring the performance of the stages and instantiating a number of instances of each stage in dependence upon the performance of one or more of the stages. Monitoring the performance of the stages can be carried out by configuring each stage to report performance statistics to a separate monitoring application that in turn is installed and running on another thread of execution on an IP block or HIP. Performance statistics can include, for example, time required to complete a data processing task, a number of data processing tasks completed within a particular time period, and so on, as will occur to those of skill in the art. Instantiating a number of instances of each stage in dependence upon the performance of one or more of the stages can be carried out by instantiating, by an HIP, a new instance of a stage when monitored performance indicates a need for a new instance.

DMA-Accelerated Push Buffer

Figure 7:
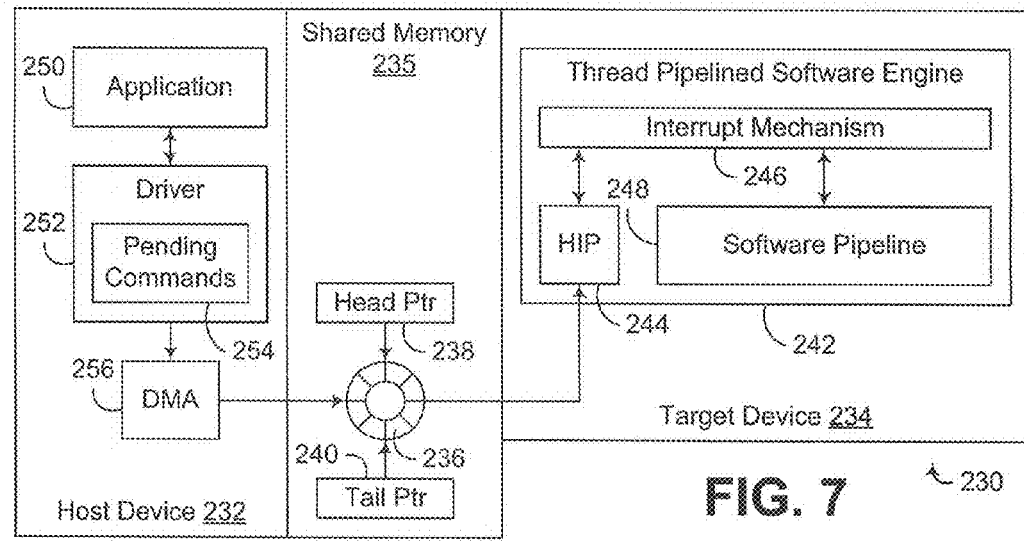
FIG. 7 is a block diagram of an exemplary implementation of a processing unit including a DMA-accelerated push buffer for communicating commands between a host device and a target device, and suitable for implementation of the thread pipelined software engine of FIG. 5.

Now turning to FIG. 7, this figure illustrates a processing unit 230 incorporating a DMA-accelerated push buffer consistent with the invention. A host device 232 and target device 234 each are capable of accessing shared data structures in a shared memory 235. Among the shared data structures are a DMA-accelerated push buffer 236 and head and tail pointers 238, 240.

Push buffer 236 may be implemented, for example, as a circular queue including a plurality of entries. Host device 232 pushes or places commands in entries in the push buffer and target device 234 pulls the commands off the push buffer in the same order in which they are placed in the buffer. Head pointer 238 typically points to the first (oldest) pending entry in the queue, while tail pointer 240 may point to either the last (newest) pending entry or the first (oldest) non-active entry, so long as the host device is able to use the tail pointer to determine where in the push buffer place a new command. It will be appreciated, however, that data structures other than circular queues may be used for a push buffer consistent with the invention.

In the illustrated embodiment, processing unit 230 is a NOC, and target device 234 implements a thread pipelined software engine 242 including one or more host interface processors (HIPs) 244 coupled via an interrupt mechanism 246 to one or more software pipelines 248, as described above in connection with FIGS. 5-6. Only one pipeline 248, as well as one associated HIP 244 and one associated push buffer 236, are illustrated in FIG. 7, although it will be appreciated that a target device may include multiple software pipelines 248, and that multiple HIPs 244 and push buffers 236 may be used to feed commands to the individual pipelines. Target device 234, for example, may implement a Graphics Processing Unit (GPU) in an image processing application. Likewise, host device 232 in the illustrated embodiment functions more like a general Central Processing Unit (CPU), and includes an application 250 that accesses the target device 234 through a device driver 252 for the target device 234 that is resident in the host device 232. It will be appreciated, however, that the principles of the invention may have benefit with other types of host and target devices that may be defined within a multithreaded processing unit. Therefore, the invention is not limited to the herein-described image processing application where a CPU-like host device controls a GPU-like target device incorporating a software pipeline.

In the embodiment illustrated in FIG. 7, host device 232 implements DMA-based acceleration of push buffer 236 through the accumulation of pending commands in the host device, coupled with a collective store of the accumulated commands in the push buffer via a DMA operation. In particular, driver 252 accumulates multiple pending commands in a block 254, e.g., in a host device-accessible data structure. Then, after multiple such commands have been accumulated in block 254, DMA logic 256 is used to collectively store the accumulated commands in push buffer 236 through a DMA transfer of block 254 to appropriate entries in push buffer 236.

DMA logic 256 may be implemented in driver 252 or elsewhere in host device 232. Furthermore, DMA logic 256 may be implemented entirely in software, or may utilize dedicated DMA hardware circuitry disposed in processing unit 230 to accelerate the transfer of block 254 from host-accessible memory to shared memory 235.

Typically, command block 254 may be of fixed size, or may be of variable size. In the embodiment of FIG. 7, for example, the command parameters, i.e., the data representing the inputs required to be provided to the target device for executing a particular command, are stored along with the command itself in a command entry in push buffer 236. Thus, command block 254 may be limited to a particular amount of memory space, whereby a fixed or variable number of commands may be stored within the memory space. Alternatively, where individual commands do not always require the same amount of memory space, command block 254 may be variable in size should it be desirable to hold a fixed number of commands in the command block.

In the embodiment of FIG. 7, the entries in push buffer 236 are of fixed size, and command block 254 is arranged with a plurality of entries that are the same size as the entries in push buffer 236, and within which the accumulated commands are stored. By doing so, the copying of command block 254 to push buffer 236 may be implemented as a straightforward DMA transfer of the block to a contiguous region in the shared memory corresponding to the push buffer.

Figure 8:
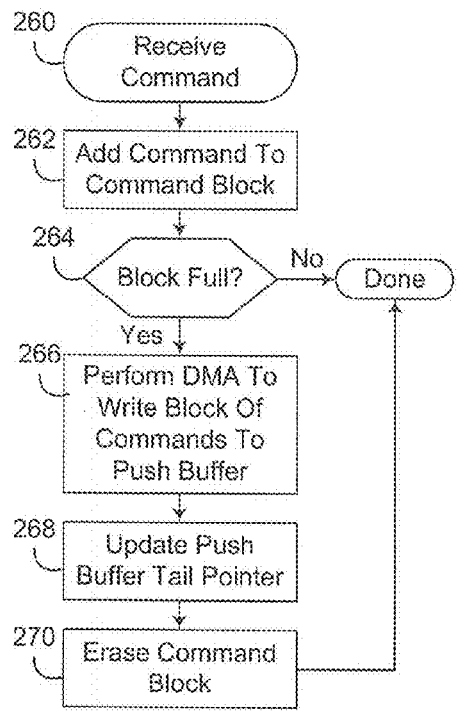
FIG. 8 is a flowchart illustrating the program flow of a command processing routine executed by the host device of FIG. 7.

FIG. 8 illustrates a command processing routine 260 implemented in driver 252 to process commands received from application 250 (FIG. 7). In response to receiving a command, block 262 adds the command to the command block in the driver. Block 264 then determines whether the command block is full. If not, forwarding of the command to the push buffer is deferred until the command block is full, so routine 260 is complete. Once the command block is full following the addition of a command to the command block, however, block 264 passes control to block 266 to perform a DMA transfer to collectively write the commands in the command block to the push buffer. Block 268 then updates the tail pointer 240 of push buffer 236 (FIG. 7) to reflect the addition of the multiple commands to the push buffer. Block 270 thereafter optionally erases command block 254, and routine 260 is complete. Alternatively, command block 254 need not be erased, but simply written over as new commands are received from the application. In addition, determining whether a block is full may be based upon all available entries in the block being used, or based upon the percentage of the block being used exceeding a threshold, or in other manners suitable for determining when a block of memory is substantially full.

Through the use of a DMA transfer of multiple commands to push buffer 236, push buffer throughput is increased, and the overhead associated with managing the push buffer is decreased. In particular, it has been found that a significant portion of the overhead associated with a push buffer is related to the management of the head and tail pointers for the push buffer. By accumulating commands and collectively transferring multiple commands in a command block, the pointers for the push buffer need to be updated only once per command block, rather than for each individual command in that command block.

Retrieval of commands from push buffer 236 by a target device, as noted above, is typically performed by a HIP 244 (FIG. 7). For example, an exemplary command processing routine executed by a HIP 244 is illustrated in greater detail in FIG. 9. HIP 244 waits in block 280 until a command is determined to be pending in push buffer 236, e.g., by monitoring pointers 238, 240 or a separate indicator associated with push buffer 236, or by receiving an interrupt whenever a new command is placed on push buffer 236. Once it is determined that a command is pending, control passes to block 282 to retrieve the command from the push buffer. Block 284 then updates the push buffer head pointer to point to the next entry in the push buffer, and block 286 then processes the command as appropriate for the target device. Control then returns to block 280 to wait for additional commands. Thus, HIP 244 operates to sequentially and individually pull commands from push buffer 236 and initiate the processing of such commands by the target device.

It will be appreciated that HIP may be implemented using any hardware and/or software suitable for providing a workable interface with a host device by retrieving commands from push buffer 236. A HIP therefore need not operate as a front end of a software pipeline, as shown in the illustrated embodiments.

In the embodiment of FIG. 7, commands and their related data, or parameters, are collectively stored in push buffer 236. However, in other embodiments, it may be desirable to store commands separately from their related parameters. By doing so, the entries in the push buffer may typically be smaller in size, as the entries are no longer required to store parameter data for the commands as well. Furthermore, variable sized parameters are better accommodated, since push buffer entries need not be sized to handle the largest expected command parameters.

Figure 10:
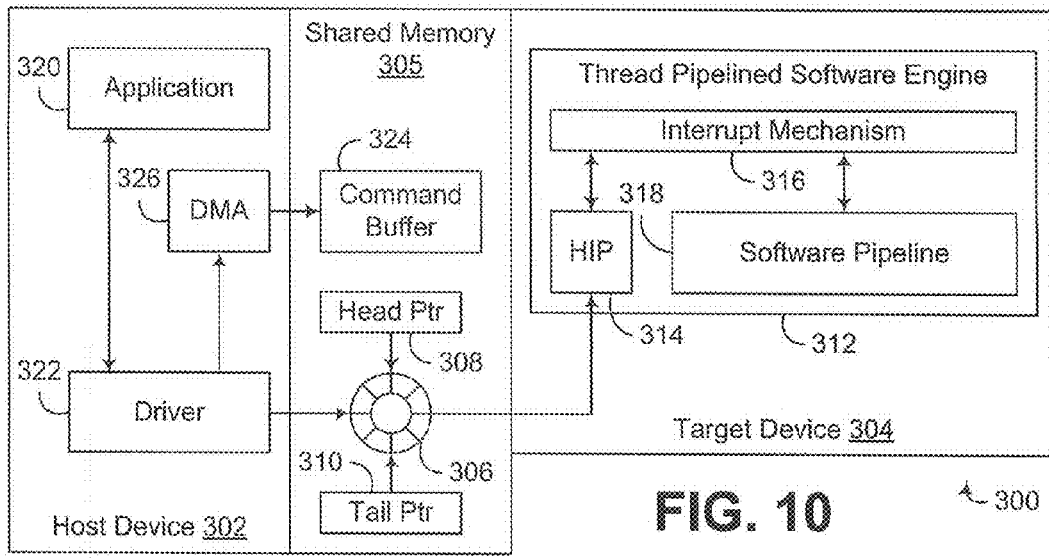
FIG. 10 is a block diagram of another exemplary implementation of a processing unit including a DMA-accelerated push buffer to that of FIG. 7, including a separate command buffer.

Therefore, in lieu of storing command parameters along with commands in a push buffer, it may be desirable in some embodiments to store command parameters in a separate data structure (hereinafter referred to as a command buffer), and to store a pointers to the command parameters within the commands themselves. FIG. 10, for example, illustrates a processing unit 300 that is similarly configured to processing unit 230 of FIG. 7, including a host device 302 and target device 304 having access to shared data structures in a shared memory 305. Among the shared data structures are a DMA-accelerated push buffer 306 and head and tail pointers 308, 310. Target device 304 implements a thread pipelined software engine 312 including one or more host interface processors (HIPs) 314 coupled via an interrupt mechanism 316 to one or more software pipelines 318, and host device 302 includes an application 320 that accesses the target device 304 through a device driver 322 for the target device 304 that is resident in the host device 302.

In addition, processing unit 300 includes an additional command buffer 324 in shared memory 305 that is separate from push buffer 306, and that is used to store parameters associated with the commands in push buffer 306. Furthermore, DMA logic is provided in host device 302 to accelerate the transfer of command parameters from host device 302 to command buffer 324.

Figure 11:
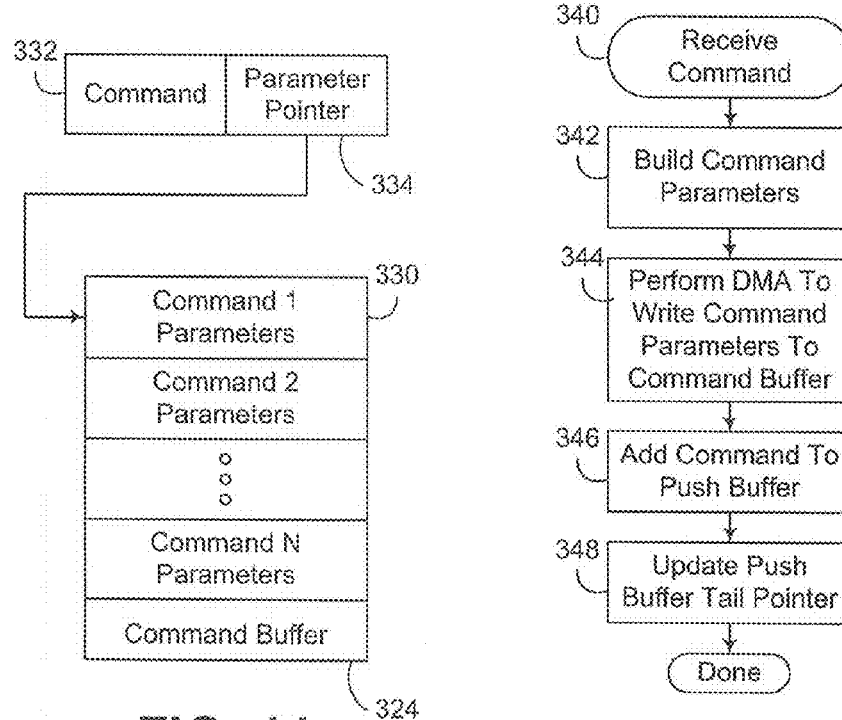
FIG. 11 is a block diagram of the command buffer of FIG. 10.

Command buffer 324 may be implemented in a number of manners consistent with the invention. For example, as shown in FIG. 11, command buffer 324 may be configured with a plurality of entries 330, with each command 332 including a pointer 334 that points to a particular entry 330 in command buffer 324. Entries 330 may be fixed or variable in size, as may command buffer 324. Furthermore, pointer 334 may be an absolute or relative pointer, e.g., specifying either an absolute address in shared memory 305 or an offset address from a base address for command buffer 324. Pointer 334 may also be implemented as an index, e.g., where entries 330 are all of the same size.

Figure 12:
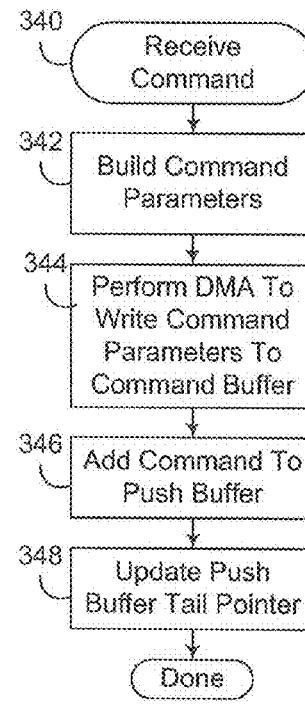
FIG. 12 is a flowchart illustrating the program flow of a command processing routine executed by the host device of FIG. 10.

FIG. 12 illustrates a command processing routine 340 implemented in driver 322 to process commands received from application 320 (FIG. 10). In response to receiving a command, block 342 builds the parameters for the command. Block 344 then performs a DMA transfer to store the command parameters into command buffer 324. Block 346 then stores or adds the command to the push buffer, with a pointer in the command pointing to the command parameters in command buffer 324. Block 348 then updates the tail pointer 310 of push buffer 306 (FIG. 10) to reflect the addition of the command to the push buffer, and routine 340 is complete.

Figure 9:
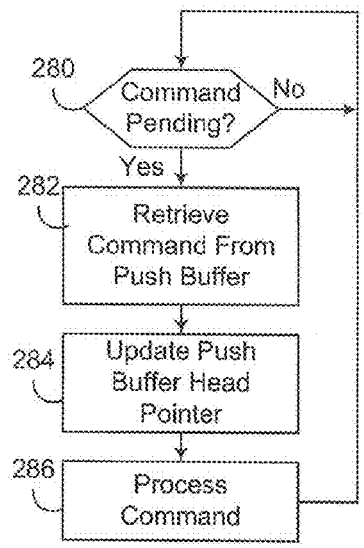
FIG. 9 is a flowchart illustrating the program flow of a command processing routine executed by the target device of FIG. 7.

Returning to FIG. 10, retrieval of commands by HIP 314 in target device 304 proceeds in much the same manner as shown in FIG. 9, with the exception that when the command is retrieved, the pointer in the command is used to access the parameters for the command from command buffer 324.

Figure 13:
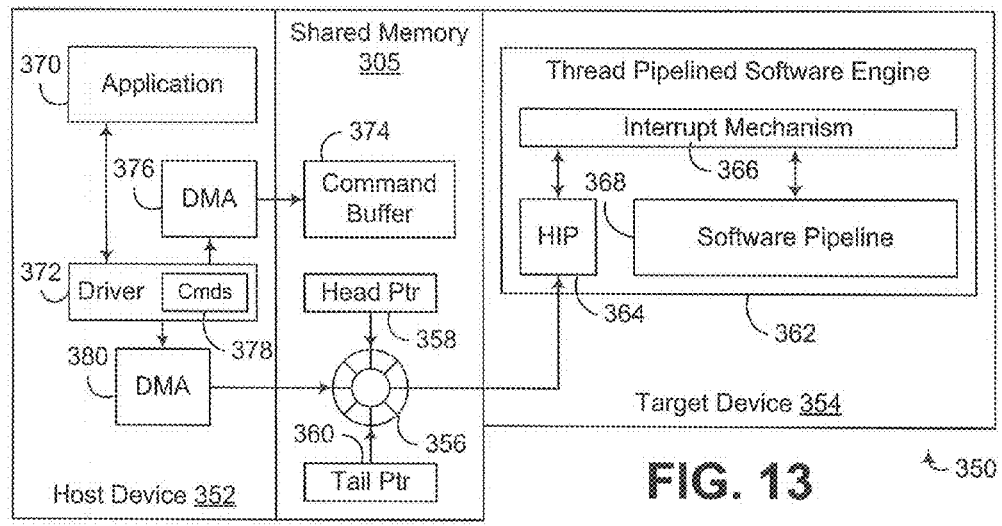
FIG. 13 is a block diagram of yet another exemplary implementation of a processing unit including a DMA-accelerated push buffer to that of FIG. 7, including a separate command buffer combined with command accumulation.

Of note, processing unit 300 of FIG. 10 pushes commands onto a push buffer on an individual basis. However, in some embodiments it may be desirable to combine the aforementioned command accumulation technique of FIGS. 7-9 with the use of a separate command buffer, as shown in FIGS. 10-12. FIG. 13, for example, illustrates a processing unit 350 that is similarly configured to processing unit 300 of FIG. 10, including a host device 352 and target device 354 having access to shared data structures in a shared memory 355. Among the shared data structures are a DMA-accelerated push buffer 356 and head and tail pointers 358, 360. Target device 354 implements a thread pipelined software engine 362 including one or more host interface processors (HIPs) 364 coupled via an interrupt mechanism 366 to one or more software pipelines 368, and host device 352 includes an application 370 that accesses the target device 354 through a device driver 372 for the target device 354 that is resident in the host device 352.

Processing unit 350 also includes a command buffer 374 and DMA logic 376 for use in storing command parameters in a separate shared data structure from push buffer 356. Furthermore, multiple commands may be accumulated in a command block 378, with additional DMA logic 380 used to transfer blocks of commands to push buffer 356. It will also be appreciated that DMA logic 376, 380 may also be combined, or may use the same underlying hardware DMA circuitry, in some embodiments of the invention.

Figure 14:
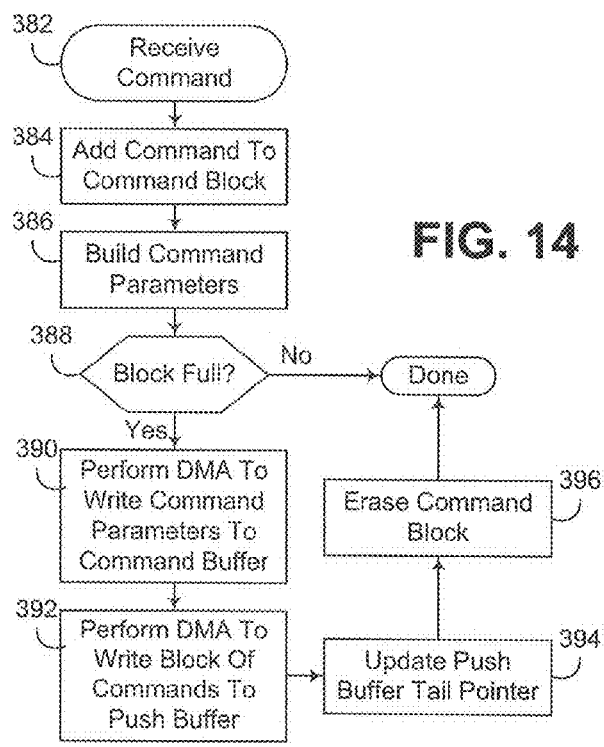
FIG. 14 is a flowchart illustrating the program flow of a command processing routine executed by the host device of FIG. 13.

FIG. 14 illustrates a command processing routine 382 implemented in driver 372 to process commands received from application 370 (FIG. 13). In response to receiving a command, block 384 adds the command to the command block in the driver. Block 386 then builds the parameters for the command, e.g., within host-accessible memory. Block 388 then determines whether the command block is full. If not, forwarding of the command to the push buffer is deferred until the command block is full, so routine 382 is complete. Once the command block is full following the addition of a command to the command block, however, block 388 passes control to block 390 to perform a DMA transfer to store the command parameters for the accumulated commands into command buffer 374. Block 392 then performs a DMA transfer to collectively write the commands in the command block to the push buffer. Block 394 then updates the tail pointer 360 of push buffer 356 (FIG. 13) to reflect the addition of the multiple commands to the push buffer. Block 396 thereafter optionally erases command block 378, and routine 382 is complete.

In alternative embodiments, the DMA transfers of the command parameters may be performed as each command is received, such that when the command block is full, only the command parameters for the last command, and the commands themselves, need to be transferred.

In still other embodiments, it may be desirable to enable some commands to receive priority treatment, and not be accumulated or deferred by a host device. FIG. 14, for example, illustrates a command processing routine 400 that, similar to routine 382, adds a received command to the command block in block 402, and builds the parameters for the command in block 404. Unlike in routine 382, however, before determining whether the command block is full, control passes to block 406 to determine whether the command should be processed immediately, thus terminating the accumulation of commands in the command block prior to the command block becoming full. If so, control passes to blocks 408, 410, 412 and 414 to perform a DMA transfer to store the command parameters for the accumulated commands into command buffer, perform a DMA transfer to collectively write the commands in the command block to the push buffer, update the tail pointer and optionally erase the command block. Returning to block 406, if the command does not need to be processed immediately, control passes to block 416 to determine whether the block is full. If the block is full, control passes to block 408 to push the commands in the block to the push buffer. Otherwise, routine 400 is complete.

Determining whether a command needs to be processed immediately may vary in different embodiments. Commands may be designated as immediate commands through the use of special opcodes, flags or parameters. Certain types of commands, e.g., syncing commands such as glXSwapBuffer or blocking response commands such as getFloatv, may be known to require immediate processing. Commands may be associated with priorities or certain threads issuing commands may be granted priority. Other variations will be apparent to one of ordinary skill in the art.

In addition, various other modifications may be made without departing from the spirit and scope of the invention. Therefore, the invention lies in the claims hereinafter appended.

What is claimed is:

1. A circuit arrangement, comprising:
a push buffer configured to store pending commands from a host device to be processed by a target device;
a host interface processor disposed in the target device and configured to retrieve pending commands from the push buffer and initiate processing of the commands by the target device;
control logic configured to accumulate a plurality of commands from the host device and perform a collective operation to store the accumulated plurality of commands in the push buffer, wherein the control logic includes Direct Memory Access (DMA) logic configured to write the accumulated plurality of commands to the push buffer when performing the collective operation; and
a command buffer configured to store parameter data for a first command from among the accumulated plurality of commands, wherein the control logic is configured to store, along with the first command in the push buffer, a pointer to the parameter data in the command buffer.

2. The circuit arrangement of claim 1, wherein the push buffer comprises a circular queue including a plurality of entries and head and tail pointers pointing to selected entries in the push buffer, wherein the push buffer is resident in a shared memory accessible by the host and target devices, and wherein the control logic is resident in the host device and includes a device driver for the target device.

3. The circuit arrangement 1, further comprising a plurality of processing cores coupled to one another via a network on chip architecture, wherein the target device comprises a graphics processing unit (GPU) implemented using a first portion of the plurality of processing cores and the host device comprises a central processing unit (CPU) implemented using a second portion of the plurality of processing cores, and wherein the GPU comprises a multithreaded software pipeline controlled by the host interface processor in response to commands from the host device.

4. The circuit arrangement of claim 1, wherein the host interface processor is configured to sequentially and individually pull commands out of the push buffer and update a pointer in the push buffer as commands are pulled from the push buffer.

5. The circuit arrangement of claim 1, wherein the control logic is configured to accumulate the plurality of commands in a block, and wherein the DMA logic is configured to write the block of accumulated plurality of commands to the push buffer.

6. The circuit arrangement of claim 1, wherein the control logic is configured to update a pointer in the push buffer after storing the accumulated plurality of commands in the push buffer to notify the host interface processor of the addition of the plurality of commands to the push buffer.

7. The circuit arrangement of claim 1, wherein the control logic includes Direct Memory Access (DMA) logic configured to write the parameter data for the first command in the command buffer.

8. The circuit arrangement of claim 1, wherein the control logic is configured to accumulate commands into a fixed size block and perform the collective operation to store the accumulated commands in the push buffer only after substantially filling the fixed size block.

9. The circuit arrangement of claim 8, wherein the control logic is configured to selectively terminate the accumulation of commands into the fixed size block prior to substantially filling the fixed size block in response to receiving a predetermined command requiring immediate attention by the host interface processor.

10. An integrated circuit device including the circuit arrangement of claim 1.

11. A program product comprising a non-transitory computer readable medium and logic definition program code resident on the computer readable medium and defining the circuit arrangement of claim 1.

12. A circuit arrangement, comprising:
a push buffer configured to store pending commands to be processed by a target device;
a host interface processor disposed in the target device and configured to retrieve pending commands from the push buffer and initiate processing of the commands by the target device;
a command buffer configured to store parameter data associated with a first command;
Direct Memory Access (DMA) logic configured to write the parameter data for the first command in the command buffer; and
control logic configured to store the first command in the push buffer by storing in the push buffer along with the first command a pointer to the parameter data in the command buffer.

13. The circuit arrangement of claim 12, wherein the control logic is further configured to accumulate a plurality of commands from the host device and perform a collective operation to store the accumulated plurality of commands in the push buffer.

14. The circuit arrangement of claim 13, wherein the control logic is configured to accumulate the plurality of commands in a block, and wherein the control logic includes second Direct Memory Access (DMA) logic configured to write the block of accumulated plurality of commands to the push buffer.

15. The circuit arrangement of claim 13, wherein the control logic is configured to update a pointer in the push buffer after storing the accumulated plurality of commands in the push buffer to notify the host interface processor of the addition of the plurality of commands to the push buffer.

16. The circuit arrangement of claim 13, wherein the control logic is configured to accumulate commands into a fixed size block and perform the collective operation to store the accumulated commands in the push buffer only after substantially filling the fixed size block.

17. The circuit arrangement of claim 16, wherein the control logic is configured to selectively terminate the accumulation of commands into the fixed size block prior to substantially filling the fixed size block in response to receiving a predetermined command requiring immediate attention by the host interface processor.

18. A method of passing commands from a host device to a target device via a push buffer interposed therebetween, the method comprising:
accumulating a plurality of commands from the host device;
after accumulating the plurality of commands, performing a collective operation to store the accumulated plurality of commands in the push buffer using Direct Memory Access (DMA) logic to write the accumulated plurality of commands to the push buffer when performing the collective operation;
with a host interface processor disposed in the target device, retrieving commands from the push buffer and initiating processing of the commands by the target device;
storing parameter data for a first command from among the accumulated plurality of commands in a command buffer; and
storing, along with the first command in the push buffer, a pointer to the parameter data in the command buffer.

19. The method of claim 18, wherein accumulating the plurality of commands includes accumulating the plurality of commands in a block, and wherein performing the collective operation includes using the DMA logic to write the block of accumulated plurality of commands to the push buffer.

20. The method of claim 18, further comprising updating a pointer in the push buffer after storing the accumulated plurality of commands in the push buffer to notify the host interface processor of the addition of the plurality of commands to the push buffer.

21. The method of claim 18, wherein accumulating the plurality of commands includes accumulating commands into a fixed size block, and wherein performing the collective operation to store the accumulated commands in the push buffer is performed only after substantially filling the fixed size block.

22. The method of claim 21, further comprising selectively terminating the accumulation of commands into the fixed size block prior to substantially filling the fixed size block in response to receiving a predetermined command requiring immediate attention by the host interface processor.

23. A method of passing commands from a host device to a target device via a push buffer interposed therebetween, the method comprising:
with Direct Memory Access (DMA) logic, writing parameter data for a first command in a command buffer;
storing the first command in the push buffer, including storing in the push buffer along with the first command a pointer to the parameter data in the command buffer; and
with a host interface processor disposed in the target device, retrieving the first command from the push buffer and initiating processing of the first command by the target device.

* * * * *